May 19, 1925. 1,538,202
W. J. P. MOORE
INNER ARCH FOR PNEUMATIC TIRES
Filed April 9, 1924
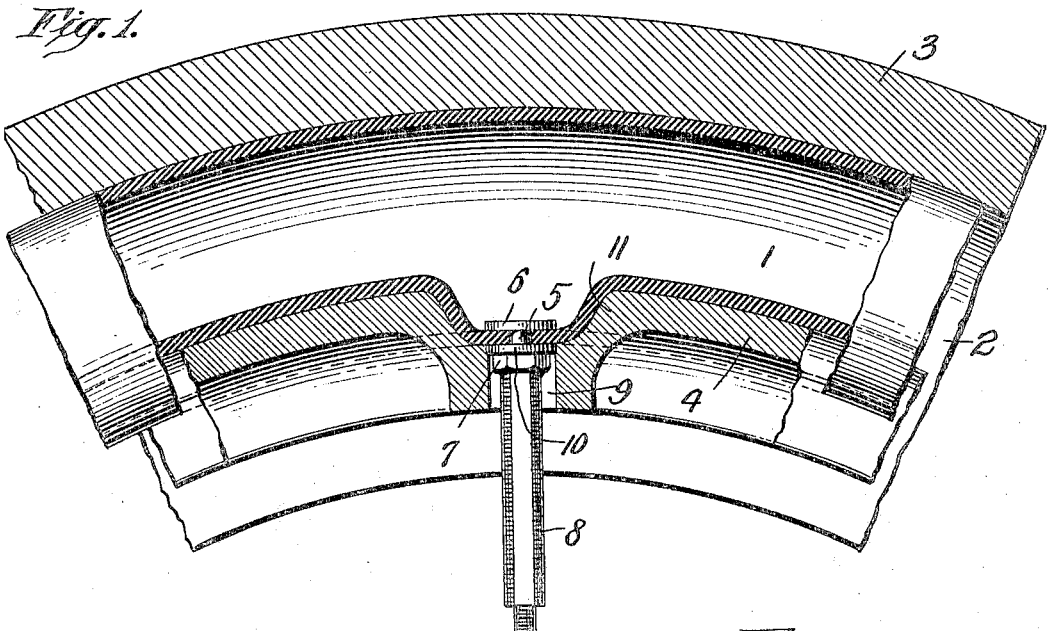
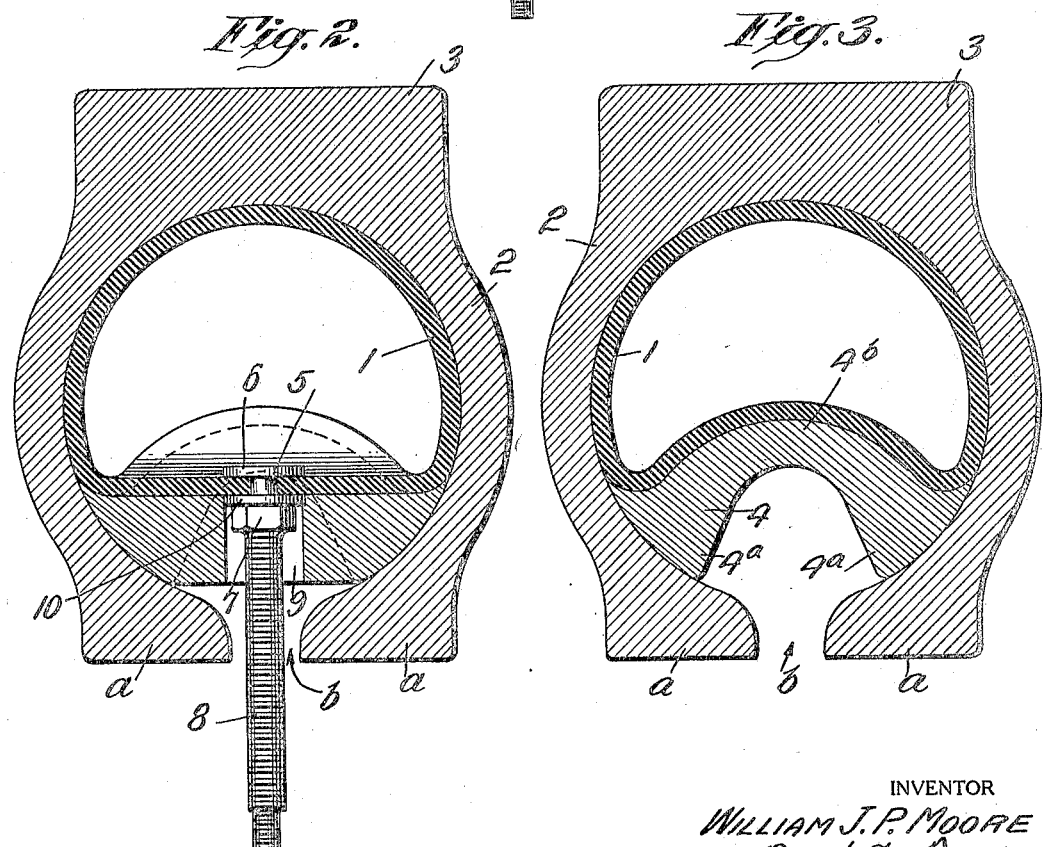
INVENTOR
WILLIAM J. P. MOORE
BY
ATTORNEY Patented May 19, 1925.

1,538,202

UNITED STATES PATENT OFFICE.

WILLIAM J. P. MOORE, OF NEW YORK, N. Y.

INNER ARCH FOR PNEUMATIC TIRES.

Application filed April 9, 1924. Serial No. 705,304.

*To all whom it may concern:*

Be it known that I, WILLIAM J. P. MOORE, a citizen of the United States, and resident of New York city, in the county of New York and State of New York, have invented certain new and useful Improvements in Inner Arches for Pneumatic Tires, of which the following is a specification, reference being had therein to the accompanying drawing.

My present invention relates generally to all forms and types of pneumatic tires, and more particularly to a novel form of flap or inner arch practically of an inverted U form, for improving and increasing and correcting the natural inherent lack of stability of all types of pneumatic tires, permitting an increased degree of tire deflection with a consequent lower air pressure and easier riding qualities, as well as providing a means for limiting the maximum or abnormal amount of deflection when the tire strikes an irregular and hard object violently, also to prevent the tire in case of puncture or complete deflation from riding on the rim and perhaps completely destroying shoe and tube in consequence, besides providing a cushioning means in such cases, so that the tire may continue to function until a relief destination is reached. With these and numerous other objects and advantages in view, my invention may be said to consist in the aforesaid novel flap or inner bracing arch for use with the tube and casing of a pneumatic tire, and in certain details and peculiarities in the construction, combination, and arrangement of parts, substantially as will be hereinafter described and claimed.

In the accompanying drawing illustrating my invention,—

Figure 1 is a longitudinal section of a portion of a pneumatic tire provided with my present improved inner flap or arch device for promoting lateral stability in the tire.

Figure 2 is a transverse section of the same at the point where the air-filling valve of the inner tube is situated.

Figure 3 is a similar transverse section at any other point in the circumference of the tire.

Like characters of reference denote like parts throughout the different figures of the drawing.

Pneumatic tires as now extensively used on motor cars of many kinds consist of three essential parts; (a) the round or cylindrical segmental shoe or outer casing of practically uniform thickness of tire wall and made of cotton fabric impregnated with rubber, with a built up tread of homogeneous rubber composition, and at its inner diameter the two projecting lips or feet with an intervening space between them to provide access to the interior. (b) An inner tube within this casing of soft rubber with its valve and valve stem. (c) A thin U-shaped flap of woven cotton material to prevent the tube from coming into contact with the metal wheel rim, which rim soon becomes rusted and would destroy the tube without such a protective member as the flap.

Therefore the common and well known form of flap, which is of a crescent or wide U shape with thin edges, has no other function than to prevent the inner tube from coming into contact with the rim and deteriorating by rust.

1 denotes the rubber inner tube; 2 the outer shoe or casing, having a thickened tread 3. The tube 1 is provided with a valve device having stem 8 connected to a section 5 passing through the wall of the tube, and provided with a fixed disc or head plate 6 on the inside of tube 1 and a loose plate 10 on the outside, against which bears a lock nut 7. 4 denotes my improved inner arch which takes the place of the usual flap, being entirely distinct in form and different from it as commonly made, but which does all that the flap does, and very many other things, including the important function of imparting lateral stability to the tire, a function that the ordinary flap does not do at all.

The shape of the arch 4 is that of an inverted U, and it amounts to inverting the crescent or wide U flap and thickening it, especially the edges. By so doing the inverted flap, as it were, when placed between the inner tube 1 and the inner thick lips a, a, (on opposite sides of the circular opening b in shoe 2) forms in effect, an internal arch or stay, having the extreme edges resting on the inner side of the shoe for any desired distance near the base of the tire. The air pressure within the inner tube tends to flatten the arch where it is thin near the center and forces this flexible and elastic arch to be slightly depressed and causes the basal edges of the arch to move outwardly and to press hard against the inner side of the casing and thus also slightly extend the casing outwardly for the distance of the base of the arch. This slight extension or deflection is greatest at the top of the base of the arch where the shoe is the thinnest and gradually decreases toward the base where the shoe is considerably thicker.

A brief inspection of the relation of the tube 1, the shoe 2, and the other parts to each other when placed under the strains and stresses of vigorous use, convinces us at once that in order to increase the lateral stability of any pneumatic tire and prevent lateral movement it is necessary to mechanically hold in a firm position internally both of the inside inclined edges of the shoe slightly above the base and prevent them from moving toward the centre of the tire; for, assuming the tendency is to move from left to right, it is evident the left side must be held and prevented from going, and if this is done, the right side is also prevented from moving, and vice versa.

To effectually accomplish this I have conceived the plan of reconstructing the ordinary elastic U-shaped flap by arranging a new flap member 4, which is a flap in an inverted position, being an inverted U or V and thickening it at the base portions, 4ª, 4ª, leaving it thinner at 4ᵇ, so that it forms an arch, with its extreme ends 4ᶜ resting on the inwardly-inclined edges of the lips a, a, of the shoe, and having the inner tube 1 resting on the upper side of the part 4ᵇ of the arch or flap, that is to say, in the same relative position the ordinary flap occupies at present, and when the arch is in this position, one side of the flexible inner tube 1 will be pressed in, so that a cross-section of said tube at this time will be crescent-shaped or semi-circular, see Figure 3. The air pressure in tube 1 will now act to compress the arch 4 and press the ends 4ᶜ firmly against the shoe, and this pressure may extend from the base of the shoe to any desired point above the base, so as to give great lateral stability to the base of the tire, so that an excessive air pressure is not necessary to improve its lateral stability, and the lowest air pressure possible can be carried giving the maximum of deflection desired for easy riding.

I preferably form a depressed section 11 in the arch 4 at the point where the valve device is attached to the inner tube, see Figure 1, and adjoining the opening 9 in the arch where the valve stem 8 passes through the arch; and this keeps the valve stem head plate 6 and nut 7 from injuring the outer half of the inner tube in case of abnormal deflection or complete deflation.

It will be borne in mind that the carrying capacity of any pneumatic tire is based entirely on the width or midcross section of the suspending air column, always assuming a given percentage of normal deflection and the same wheel diameter; therefore the theoretical carrying capacity of the tire may be based on the tire diameter, squared, (as the thickness of the tire wall is practically a fixed percentage of the tire diameter) times a constant air pressure, which may be any assumed air pressure desired, and the less the air pressure the greater the normal deflection and the easier riding of the tire; and it becomes merely a question of producing a tire to meet the conditions in a tire so constructed as to have the necessary stability and especially lateral stability and that will withstand these deflections. Whatever normal deflection may be fixed upon is immaterial and the pressure and volume of air within the tube is also always a constant, or is fixed, and deflection does not affect this air volume or air pressure, as the tire casing only changes its shape and is merely distorted, and is neither compressed nor stretched. In fact the air pressure must always be absolutely the same everywhere in the inner tube.

The result therefore of having the arch or flap is, that in the event of any transverse or side strain being brought upon the tire casing, the side wall is held from deflecting inwardly or laterally inward, and this at the same time prevents the opposite side wall also from being carried laterally outward, and thus imparts a very considerable degree or amount of lateral stability to the complete tire; where normally, without this arch, only the thickness of the side wall and the air pressure prevents the tire from having lateral motion. Even with the high air pressures now carried in heavy pneumatic tire casings, the lateral stability is not sufficient, and as the air pressure is decreased this lateral stability may become practically nothing, as in the case of a deflated tire. With the lower air pressures now being carried on the "semi-loaded" or so-called "balloon" tires, any lateral stability so imparted to the tire by the air pressure is correspondingly reduced one half, and it becomes necessary to provide other means for giving the pneumatic tire the necessary lateral stability, and when provided in the form of my improved arch or stay piece, this can be done without unnecessary complication or expense.

The supporting flap or arch has a secondary function in that it can be so shaped as to act to limit the maximum deflection of the tires in the event of the tire going over any high and hard substance, such as the edge of the curb, it will entirely prevent the tire walls from being jammed down on to the rim flanges and injuring the tire, as before this is done, the tire walls will press strongly on the elastic arch and completely cushion the blow. The inverted flap or arch has a third function in that in case of a puncture, or blowout and complete deflation of the tire, the deflated tire will press upon the elastic flap or arch and the tire will function as a cushion tire for an indefinite period or at least until arrival at destination without causing damage to the shoe or inner tube, and entirely prevents the necessity for stopping on the road or other inconvenient place to replace the defective tire. In fact, except in the case of long and extended trips, there might be little if any use in carrying an extra tire.

Having thus described my invention, what I claim as new and desire to secure by Letters Patent, is:

1. In a pneumatic tire, the combination with a casing and an inner tube of an arching flap interposed between the heavier basal portions of the shoe and the tube, and initially pressing one side of the tube inwardly before inflation and acting after inflation to impart lateral stability to the tire.

2. In a pneumatic tire, the combination with a casing and an inner tube, of an inner arch having thickened base portions and a relatively thinner intermediate portion and interposed between the tube and the inner face of the wall of the shoe to furnish lateral stability to the tire.

3. The combination with a tire casing and an inner tube within the same, of a flap consisting in a curved piece humped against the inner tube and of substantial thickness and adapted to be more or less flattened when the tube is inflated, so as to brace between the opposite walls of the shoe.

4. The combination with a casing and an inner tube of an inner arch thicker at the basal edges than in the middle and having a depression section for the means for connecting the valve device to the tube and perforated to allow the passage of the valve stem.

5. The combination in a tire of an outer casing, an inner tube, and an arch of substantial rigidity, arranged between the tube and the inner sides of the shoe, to afford lateral stability to the tire.

In testimony whereof I hereunto affix my signature.

WILLIAM J. P. MOORE.